(12) United States Patent
Song et al.

(10) Patent No.: US 8,409,018 B2
(45) Date of Patent: Apr. 2, 2013

(54) GAME CONTROLLER AND METHOD FOR HARVESTING USER ENERGY EXPENDED WHILE PLAYING A GAME

(75) Inventors: Byung-youn Song, Suwon-si (KR); Nag-eui Choi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/213,674

(22) Filed: Aug. 19, 2011

(65) Prior Publication Data
US 2012/0129603 A1 May 24, 2012

(30) Foreign Application Priority Data
Nov. 19, 2010 (KR) .................. 10-2010-0115740

(51) Int. Cl.
*A63F 9/02* (2006.01)
(52) U.S. Cl. ............... 463/52; 463/30; 463/36; 463/37; 463/38; 463/51
(58) Field of Classification Search ............... 318/114; 320/137; 333/193; 340/10.1; 345/158; 463/30, 463/36–39, 47, 51–52
See application file for complete search history.

(56) References Cited

U.S. PATENT DOCUMENTS

| | | | |
|---|---|---|---|
| 6,078,229 A * | 6/2000 | Funada et al. | 333/193 |
| 6,271,760 B1 * | 8/2001 | Watanabe et al. | 340/667 |
| 6,328,651 B1 * | 12/2001 | Lebensfeld et al. | 463/52 |
| 6,811,491 B1 * | 11/2004 | Levenberg et al. | 463/47 |
| 2003/0032478 A1 * | 2/2003 | Takahama et al. | 463/30 |
| 2005/0192129 A1 * | 9/2005 | Kuwabara | 473/520 |
| 2007/0040655 A1 * | 2/2007 | Lee et al. | 340/10.1 |
| 2009/0021191 A1 * | 1/2009 | McReynolds et al. | 318/114 |
| 2009/0258706 A1 * | 10/2009 | Rofougaran et al. | 463/39 |
| 2010/0277126 A1 * | 11/2010 | Naeimi et al. | 320/137 |
| 2010/0283731 A1 * | 11/2010 | Grant et al. | 345/158 |

FOREIGN PATENT DOCUMENTS
KR 10-2006-0041881 5/2006

OTHER PUBLICATIONS

IGN, Controller Concepts: Gun Games, Sep. 26, 2005, http://cube.ign.com/articles/653/653867p1.html.*
Charles Herold, Komodo's Buckshot Lock and Load Gun Shell—Review, About.com, Nov. 13, 2009, http://nintendo.about.com/od/accessories/fr/buckshotshell.htm.*

* cited by examiner

*Primary Examiner* — Dmitry Suhol
*Assistant Examiner* — Jason Yen
(74) *Attorney, Agent, or Firm* — NSIP Law

(57) ABSTRACT

A game controller, a game machine, and a game system using the game controller is provided. The game controller manipulates a game program, and includes an energy harvesting unit to harvest motion of a user as energy when a game is played and an energy storing unit to store the energy harvested by using the energy harvesting unit.

18 Claims, 6 Drawing Sheets

162 163  161  164 165

GAME CONTROLLER AND METHOD FOR HARVESTING USER ENERGY EXPENDED WHILE PLAYING A GAME

CROSS-REFERENCE TO RELATED PATENT APPLICATION

This application claims the benefit under 35 U.S.C. §119 (a) of Korean Patent Application No. 10-2010-0115740, filed on Nov. 19, 2010, in the Korean Intellectual Property Office, the disclosure of which is incorporated herein in its entirety by reference for all purposes.

BACKGROUND

1. Field

The following description relates to game controllers, game machines, and game systems using the game controllers.

2. Description of the Related Art

Generally, a game controller may be used to control characters displayed on a display device and may include manipulation buttons for playing a game. The game controller may be connected to a game console or a computer device via a wire or wireless connection.

Conventional game systems may display images in three dimensions and may include game controllers optimized to particular games to influence a user's interaction when playing games. For example, for a car driving game, a game controller may be in the form of a car steering wheel. This type of game controller may influence a user's interaction with the car driving game such that the user may experience a sensation that he/she is driving a car. For a shooting game, a game controller may be in the form of a gun. This type of game controller may influence a user's interaction with the shooting game such that the user may experience a sensation that he/she is shooting a gun.

SUMMARY

In one general aspect, there is provided a game controller to manipulate a game program, including an energy harvesting unit configured to harvest motion of a user as energy when playing a game, and an energy storing unit configured to store the energy harvested by the energy harvesting unit.

The energy harvesting unit may include one of a linear generator and a rotational generator including a fixed magnet and a coil movable relative to the fixed magnet.

The game controller may further include a body portion, at least a portion thereof being deformable to have a plurality of forms, and a moving portion movable relative to the body portion, wherein one of the fixed magnet and the coil may be formed in the body portion, and the other of the fixed magnet and the coil may be formed in the moving portion.

The body portion may include a fixable multi-joint structure.

The plurality of forms may include a straight line, a straight line having two portions bent in different directions, a circle, and a circle having a grip.

The game controller may be in the form of a pump action rifle having a hand grip movable in a lengthwise direction of a body of a gun barrel, and one of the fixed magnet and the coil may be formed in the body of the gun barrel, and the other of the fixed magnet and the coil may be formed in the hand grip.

The energy harvesting unit may include an elastic body and a piezoelectric layer attached to the elastic body.

The energy storing unit may include a rectifying circuit to rectify electric energy generated in the energy harvesting unit, a charger charging a rectifying current rectified in the rectifying circuit, and a charging circuit charging the rectifying current in the charger.

The game controller may further include a reaction force generating unit to generate a reaction force according to contents of a game, and the reaction force generating unit uses electric energy stored in the energy storing unit.

The game controller may further include a game manipulation unit via which manipulation of a game by the user may be input, wherein the game manipulation unit may include at least one of a manipulation button and an operation recognizing sensor.

The game controller may further include a battery separate from the energy storing unit.

The game controller may further include a transmission/reception unit to transmit/receive data to/from a computer for executing the game program.

The game controller may further include a computer to execute the game program, according to a signal input to the game manipulation unit.

In another general aspect, there is provided a game machine including a game manipulation unit via which a manipulation of a game by a user may be input, an energy harvesting unit configured to harvest motion of the user as energy when a game may be played, an energy storing unit configured to store the energy harvested by using the energy harvesting unit, a computer unit configured to execute a game program according to a signal input by using the game manipulation unit, and a display unit to display characteristics of the game program executed in the computer unit.

The game machine may be a portable mobile device in which the game manipulation unit, the energy harvesting unit, the energy storing unit, the computer unit, and the display unit may be installed in one housing.

In another general aspect, there is provided a game system including a game controller to manipulate a game program, a computer connected to the game controller in a wired or wireless manner, wherein the game program may be executed in the computer according to a manipulation signal transmitted by using the game controller, and a display device to output an image from the computer, wherein the game controller may include an energy harvesting unit configured to harvest motion of a user to energy when a game may be played and an energy storing unit configured to store the energy harvested by using the energy harvesting unit.

In another general aspect, there is provided a method of manipulating a game program with a game controller, including harvesting motion of a user as energy when playing a game via an energy harvesting unit, and storing the energy harvested by the energy harvesting unit.

In another general aspect, there is provided a computer-readable recording medium having embodied thereon a program that, when executed by a computer, performs a method of manipulating a game program with a game controller, the method including harvesting motion of a user as energy when playing a game via an energy harvesting unit, and storing the energy harvested by the energy harvesting unit.

Other features and aspects may be apparent from the following detailed description, the drawings, and the claims.

Figure 1:
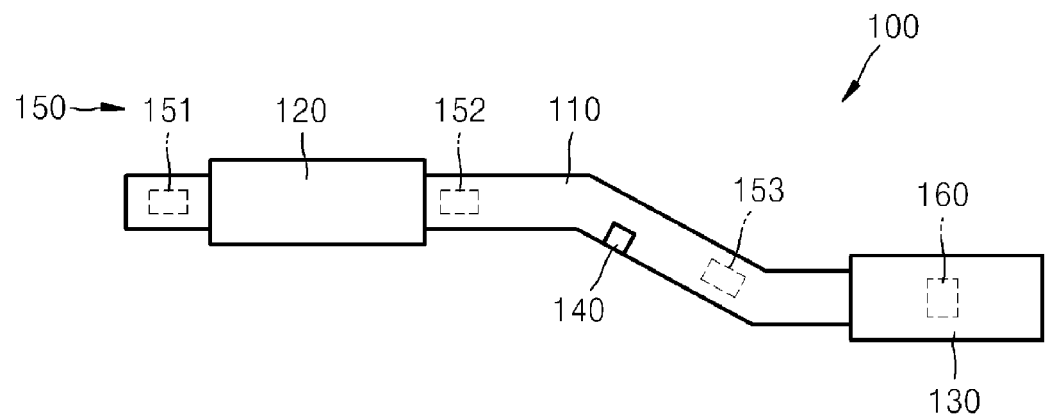
FIG. 1 is a diagram illustrating a game controller according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
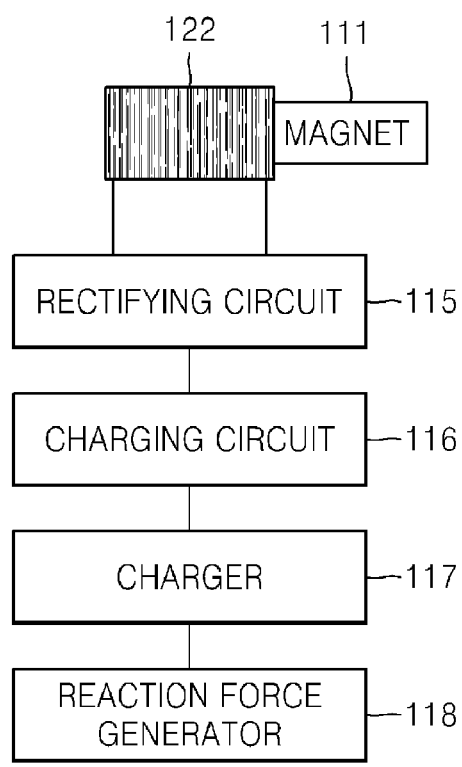
FIG. 2 is a block diagram illustrating the game controller of FIG. 1.

FIG. 1 illustrates a game controller 100 according to an example embodiment. FIG. 2 is a block diagram of the game controller 100 of FIG. 1.

Referring to FIG. 1, the game controller 100 may include a body portion 110, a moving portion 120, and a grip portion 130.

The body portion 110 may be configured with portions bent in different directions. For example, according to an example embodiment as shown in FIG. 1, the body portion 110 may have two portions at opposite ends of the body portion 110 bent in different directions. The body portion 110 and the grip portion 130 may be coupled to each other. A manipulation button 140 may be formed in a portion of the body portion 110 between the two bent portions. The manipulation button 140 may function as a trigger portion of the game controller 100. For example, in the case that the game controller 100 is configured to resemble a rifle, the manipulation button 140 may function as the trigger. The moving portion 120 may be configured on the game controller 100 to move linearly relative to the body portion 110. As mentioned, by way of example, the game controller 100 may resemble a pump action rifle in which case a first end of the body portion 110 may be a muzzle, the moving portion 120 may resemble a hand grip portion of the rifle that moves forwards and backwards to load bullets in a pump action type rifle, and the grip portion 130 may resemble a shoulder portion of the rifle.

Referring to FIG. 2, a coil 122 may be installed in the moving portion 120, and a permanent magnet 111 may be installed in the body portion 110. However, an example embodiment is not limited thereto and the positions of the coil 122 and the permanent magnet 111 may be switched, for example, such that the coil 122 may be in the body portion 110 and the permanent magnet 111 may be in the moving portion 120. The coil 122 and the permanent magnet 111 may be moved linearly relative to each other and form a linear generator. The linear generator may have a well-known structure.

When a user plays a shooting game by using the game controller 100, and while the user emulates a motion of loading of a bullet, the moving portion 120 moves relative to the body portion 110. Accordingly, the coil 122 and the permanent magnet 111 may also move relative to each other generating an electromotive force in the coil 122 by electromagnetic interaction. The electromotive force may be dependent on motion of the moving portion 120, and thus, rectified via a rectifying circuit 115 to generate a constant voltage. A current passed through the rectifying current 115 passes through a charging circuit 116 and may be charged in a charger 117. The rectifying circuit 115, the charging circuit 116, and the charger 117 may have well-known structures.

Electric energy charged in the charger 117 may be supplied, for example, to a reaction force generator 118 to be used as energy for generating a reaction force. The electric energy charged in the charger 117 may also be used for other manipulations of the game controller 100.

Furthermore, a battery (not shown) for supplying power may be formed in the game controller 100. Either the charger 117 or the battery may be used as an auxiliary element.

A moving state detection unit 150 may be formed in the body portion 110. The moving state detection unit 150 may include a plurality of detection sensors 151, 152, and 153 arranged at predetermined intervals and positions in the body portion 110. The detection sensors 151, 152, and 153 may be configured to individually or collectively detect directions of linear motion, planar motion or three-dimensional motion. For example, the detection sensors 151, 152, and 153 may be a 1-axis inertial sensor, a 2-axis inertial sensor, or a 3-axis inertial sensor. In this case, the detection sensors 151, 152, and 153 may be located at different locations in the body portion 110 from a predetermined rotational center. As such, the detection sensors 151, 152, and 153 may be configured to have different accelerations so that their rotational amounts may be detected.

The detection sensors 151, 152, and 153 may be provided in the body portion 110 to detect the movement and motion of the body portion 110. By detecting the motion of the body portion 110, the moving state detection unit 150 may function, for example, as an input unit that recognizes an operation and action performed the user to manipulate game programs being executed. For example, in the case in which the user may be playing a shooting game, the moving state detection unit 150 may detect a position or a direction of the muzzle portion of the body portion 110 when shooting.

A reaction force generating unit 160 may be formed in the grip portion 130.

Figure 3:
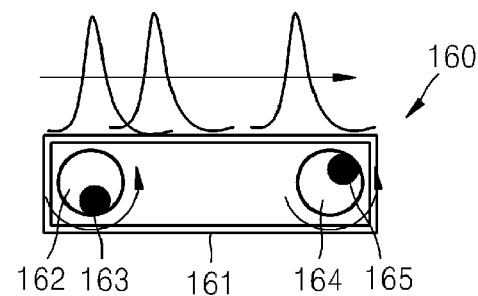
FIG. 3 is a diagram illustrating a reaction force generating unit installed in the game controller of FIG. 1, according to an example embodiment.

FIG. 3 illustrates the reaction force generating unit 160 according to an example embodiment. Referring to FIG. 3, the reaction force generating unit 160 may include two vibration motors 162 and 164 spaced apart in the grip portion 130. The vibration motors 162 and 164 may respectively include weights 163 and 165 at positions away from a rotational axis of the vibration motors 162 and 164. As such, when the vibration motors 162 and 164 rotate, vibration may be generated according to rotation of the weights 163 and 165. For example, when the weights 163 and 165 are sequentially directed in one direction, the effect may be the same as a reaction force generated in that direction. In other words, the reaction force generating unit 160 may allow the user to experience a touch sensation in response to the contents and experiences of a game. That is, a reaction force may be generated in the reaction force generating unit 160 when the manipulation button 140 is pressed to sensationalize an act of shooting.

Figure 4:
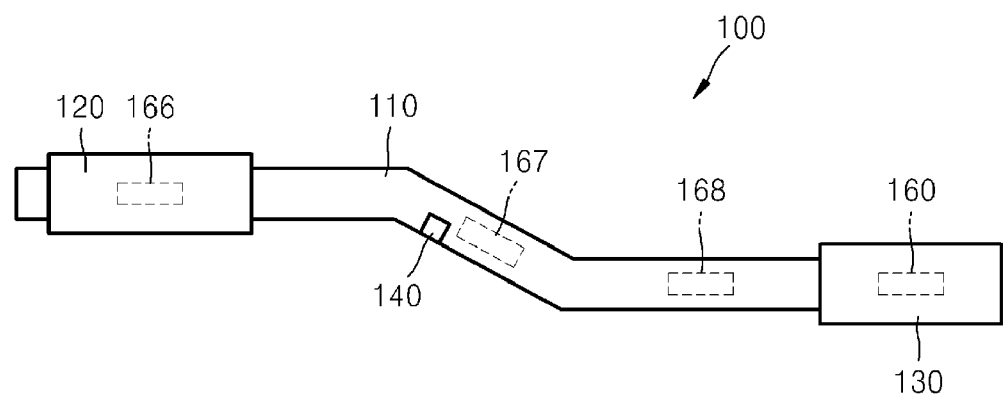
FIG. 4 is a diagram illustrating a reaction force generating unit installed in the game controller of FIG. 1, according to another example embodiment.

As illustrated in FIG. 1, the reaction force generating unit 160 may be formed in the grip portion 130. However, an aspect of the example embodiment may not be limited thereto and may include additional reaction force generating units. For example, as illustrated in FIG. 4, other reaction force generating units 166, 167, and 168 may be spaced apart at predetermined intervals in the body portion 110. A direction of the reaction force of the reaction force generating units 166, 167, and 168 may be set to be a predetermined direction of the body portion 110 so that a sensation due to the reaction force being transferred along the predetermined direction of the body portion 110 may be realized.

A magnitude of the reaction force may correspond to game contents. As such, since the reaction force generating unit 160 may generate a large reaction force according to game contents, energy for generating the reaction force may not be supplied just from the battery. Thus, the game controller 100 according to an example embodiment may convert motion of the user into electric energy and use the electric energy. Accordingly, additional energy may be charged in and supplied from the charger 117 so that the user may experience sufficient body sensation when playing a game.

According to an aspect of the example embodiment described above, the reaction force generating unit 160 may be installed in the body portion 110 so that the user experiences the physical sensation of the game. However, an example embodiment may not be limited to the reaction force generating unit 160, and instead may be configured with another vibration unit installed in the body portion 110 and capable of generating vibration according to the game contents.

At least one of the body portion 110 and the grip portion 130 may include a wireless or wired transmitting/reception unit for transmitting/receiving a signal to/from a computer (for example, a game machine main body 520 of FIG. 10) for executing a game program. Alternatively, at least one of the body portion 110 and the grip portion 130 may include a computer for executing a game program and the game controller 100 may be a game machine capable of independently executing a game program.

Figure 5:
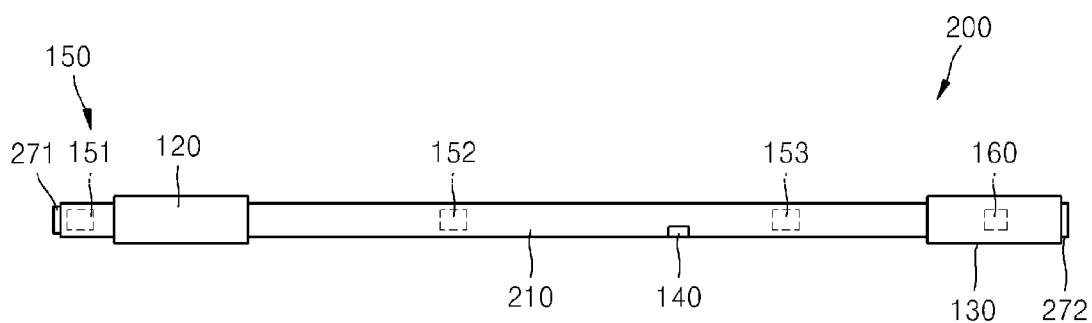
FIG. 5 is a diagram illustrating a game controller according to another example embodiment.
Figure 6:
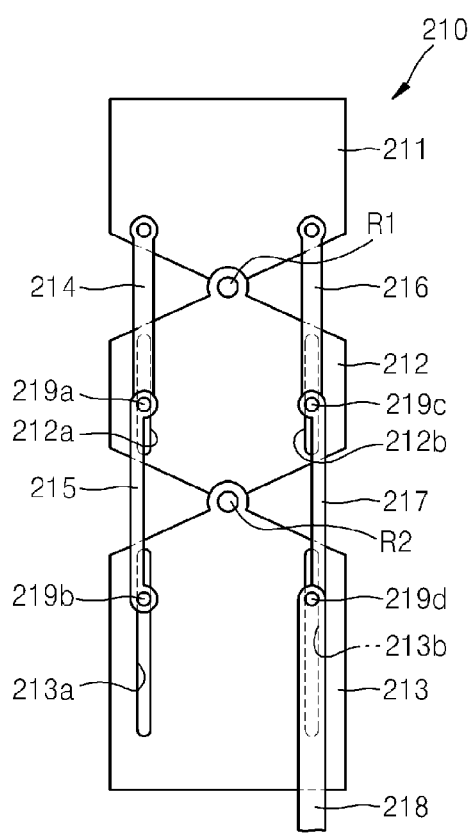
FIG. 6 is a diagram illustrating a flexible structure of the game controller of FIG. 5, according to an example embodiment.

FIG. 5 illustrates a game controller 200 according to another example embodiment. FIG. 6 illustrates an example of a flexible structure of the game controller 200 of FIG. 5.

Referring to FIG. 5, the game controller 200 may include a body portion 210, a moving portion 120, and a grip portion 130.

According to an example embodiment, the body portion 210 of the game controller 200 may have a flexible structure. As such, the body portion 210 may be deformable and configured to have a plurality of forms. That is, the body portion 210 may be deformed to have various forms such as, for example, a straight line, a straight line having two portions bent in different directions, a circle, and a circle having a grip. For example, the body portion 210 may include a first coupling unit 271 and a second coupling unit 272 respectively formed at a first end and second end of the body portion 210. The first coupling unit 271 and the second coupling unit 272 may be coupled to each other so that the game controller 200 may maintain a circular shape like that of, for example, a steering wheel. The body portion 210 may be configured to maintain the deformed form, return to a previous deformed form, or an initial structure. At least a portion of the body portion 210 may be configured to have a shape such that the moving portion 120 moves relative to the body portion 210.

FIG. 6 illustrates an example embodiment of the flexible structure of the body portion 210. Referring to FIG. 6, a plurality of frames, for example, first through third frames 211, 212, and 213 being serially arranged, may constitute a multi-joint structure rotatably coupled to one another. First and second fixing links 214 and 215 and first through third moving links 216, 217, and 218 may be formed along two lines of a central line that passes through rotational axes R1 and R2 of the frames 211, 212, and 213. A first end of the first fixing link 214 and a first end of the second moving link 216 may be rotatably fixed to the first frame 211 at a front end. Also, in the second frame 212, long grooves 212*a* and 212*b* extended in a lengthwise direction of the second frame 212 may be formed on two sides of the central line passing through the rotational axes R1 and R2. Long grooves 213*a* and 213*b* extended in a length direction of the third frame 213 may be formed on two sides of the central line passing through the rotational axes R1 and R2 in the third frame 213. A pin 219*a* that rotatably couples a second end of the first fixing link 214 and a first end of the second fixing link 215 may be inserted into the long groove 212*a* to move linearly in a lengthwise direction of the long groove 212*a*. A pin 219*b* that rotatably couples a second end of the second fixing link 215 to the third frame 213 may be inserted into the long groove 213*a* to move linearly in a lengthwise direction of the long groove 213*a*. A pin 219*c* that rotatably couples a second end of the first moving link 216 to a first end of the second moving link 217 may be inserted into the long groove 212*b* to move linearly in a lengthwise direction of the long groove 212*b*. A pin 219*d* that rotatably couples a second end of the second fixing link 215 to a first end of the third moving link 218 may be inserted into the long groove 213*b* to move linearly in a lengthwise direction of the long groove 213*b*. A position of the third moving link 218 may be selectively fixed using a separate fixing unit such as, for example, a screw, a pin, or the like.

When moving the third moving link 218 in the body portion 210 having the above-described structure, a portion of each of the first, second, and third frames 211, 212, and 213 may move around the rotational axes, and thus, the first, second, and third frames 211, 212, and 213 may bend. According to an example embodiment in which the third moving link 218 may be fixed, a bent shape of the first, second, and third frames 211, 212, and 213 may be fixed. While FIG. 6 illustrates a multi-joint structure formed of three frames (first, second, and third frames 211, 212, and 213), an example embodiment may not be limited thereto. For example, an aspect of an example embodiment may provide a body portion in which a plurality of second frames 212 may be serially connected. The body portion 210 having a multi-joint structure as described above may be deformed to have a shape according to the contents of a game as will be described later.

FIG. 6 illustrates an example embodiment of a flexible structure of the body portion 210. However, an example embodiment may not be limited thereto. For example, a multi-joint device having a fixing element formed at each joint, or other fixable structures may be used as the flexible structure of the body portion 210. That is, the body portion 210 may have a multi-joint structure with a fixing element formed at each joint and each joint may be independently rotated such that the body portion 210 may have a plurality of shapes.

In the case in which a user plays a game that may require shooting a gun, the body portion 210 having the above-described flexible structure may have a straight linear shape having two portions bent in different directions, as illustrated in FIG. 1. Also, for example, in the case in which a user plays a game that may require a straight-line type instrument such as fencing or golf, the game controller 200 may manipulate the game by using the body portion 210 having a straight linear shape as illustrated in FIG. 5. Alternatively, in the case that a user plays a game that may require a circular steering wheel such as car driving or airplane operating, the game controller 100 may manipulate the game by using the body portion 210 having a circular shape like a steering wheel. In addition, games may be manipulated by modifying the body portion 210 to other various shapes according to the characteristics of the game to play.

Figure 7:
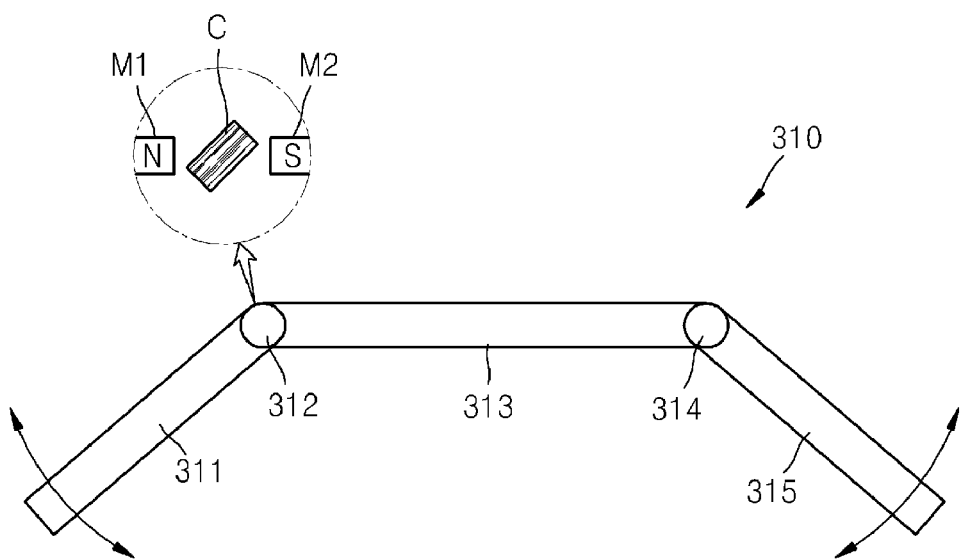
FIG. 7 is a diagram illustrating an example of a deformable shape of a body portion of the game controller of FIG. 5.

The above-described body portion 210 having a flexible structure deformable to have a plurality of various forms may not be limited thereto. FIG. 7 illustrates an example of a deformable shape of a body portion of the game controller 200 of FIG. 5. For example, as illustrated in FIG. 7, a body portion 310 may be formed of frames 311, 313, and 315 including two rotatable joint portions 312 and 314. Permanent magnets M1 and M2 may be attached to one of the rotatable joint portions 312 and 314 and a coil C may be attached to another of the rotatable joint portions 312 and 314 to rotate relative to each other. The permanent magnets M1 and M2 and the coil C illustrates an example of a rotational generator. By moving the frames 311, 313, and 315, the permanent magnets M1 and M2 and the coil C may move relative to each other, and an electromotive force may be generated in the coil C by electric interaction therebetween. As described with reference to FIG. 2, the electromotive force generated by motion of the user may be passed through the rectifying circuit 115 and the charging circuit 116 and then may be charged in the charger 117 for reuse. The frames 311, 313, and 315 illustrated as being bendable as described above may resemble a fitness instrument, and thus, a game controller including the body portion 310 as described above may be used when playing a fitness game.

Figure 8:
FIG. 8 is a diagram illustrating another example of a deformable shape of the body portion of the game controller of FIG. 5.
Figure 9:
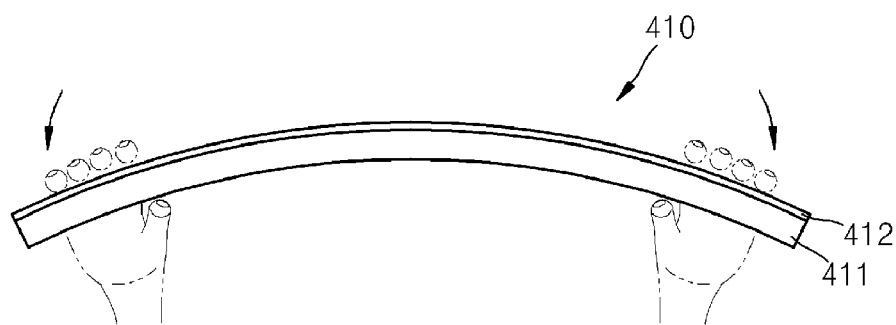
FIG. 9 is a diagram illustrating an operation of the body portion illustrated in FIG. 8.

FIG. 8 illustrates a body portion 410, according to another example embodiment of a body portion. Referring to FIG. 8, the body portion 410 may include a body 411 and a piezoelectric layer 412. The body 411 may be elastic and configured in a rod shape. The piezoelectric layer 412 may be attached to at least a portion of the body 411. As such, when the body 411 bends, the piezoelectric layer 412 also bends. When the user bends the body 411 as illustrated in FIG. 9, the piezoelectric layer 412 may generate an electromotive force by a piezoelectric effect in accordance with bending of the body 411. As described with reference to FIG. 2, the electromotive force generated by motion of the user may pass through the rectifying circuit 115 and the charging circuit 116 and may then be charged in the charger 117 for reuse. The body portion 410 illustrated as being bendable as described above may resemble a fitness instrument, and thus, a game controller including the body portion 410 as described above may be used when playing a fitness game.

Figure 10:
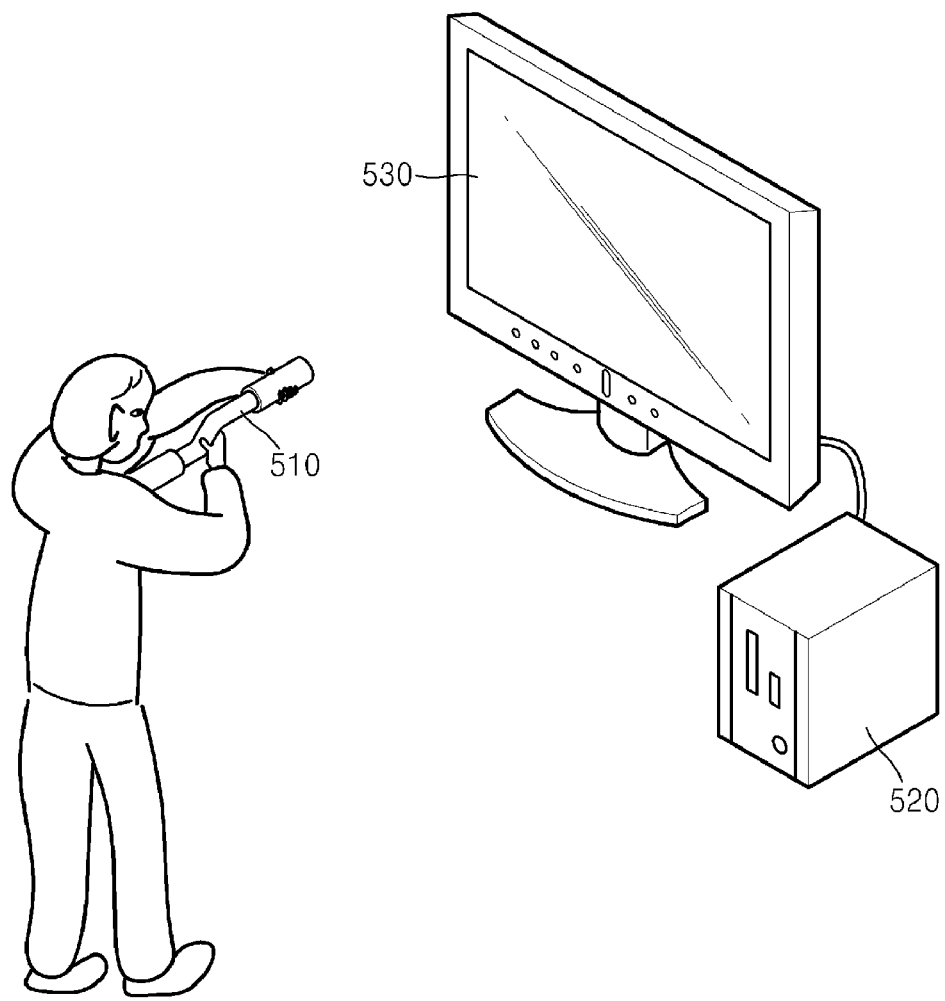
FIG. 10 is a diagram illustrating a game system according to an example embodiment.
Figure 11:
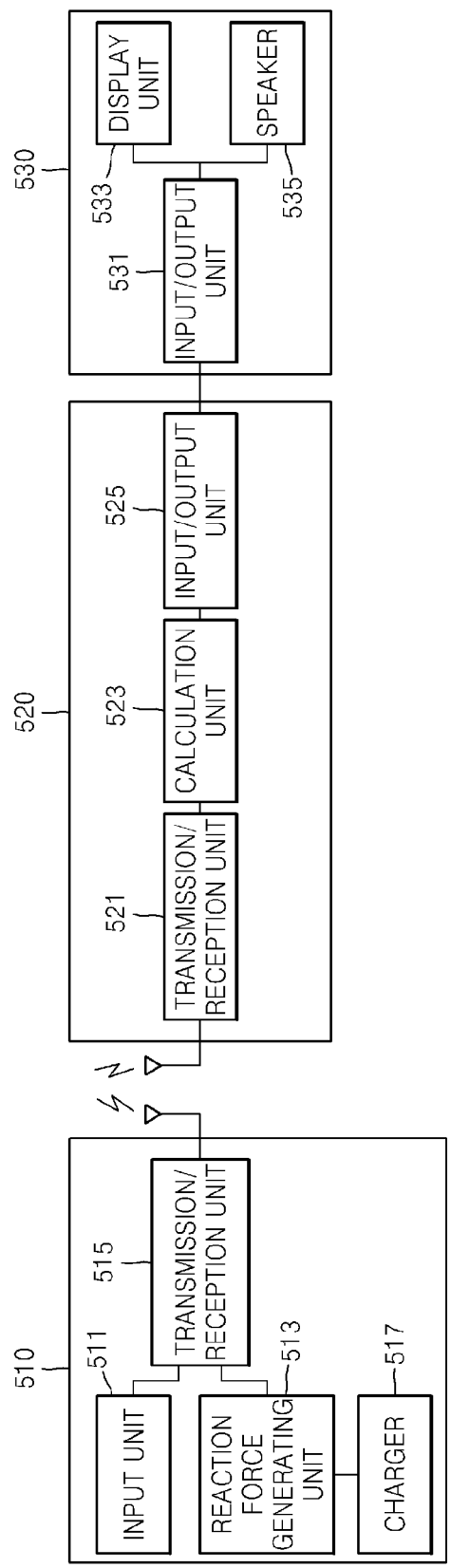
FIG. 11 is a block diagram illustrating the game system of FIG. 10.

FIG. 10 illustrates a game system according to an example embodiment. FIG. 11 is a block diagram illustrating the game system of FIG. 10.

Referring to FIGS. 10 and 11, the game system may include a game controller 510, a game machine main body 520, and a display device 530.

The game controller 510 may be the game controller 100 or 200 described with reference to FIGS. 1 through 9. The game controller 510 may include an input unit 511 like the manipulation button 140 as shown in FIG. 1 or the moving state detection unit 150 as shown in FIG. 1, a transmission/reception unit 515 that transmits or receives data to/from the game machine main body 520, and a charger 517 for storing motion of the user as energy. Furthermore, as described above, the game controller 510 may include the reaction force generating unit 160 as shown in FIG. 1 so that a user may experience a touch sensation.

The game machine main body 520 may include a transmission/reception unit 521 transmitting/receiving data to/from the game controller 510, a calculation unit 523 (for example, a computer) executing game programs, and an input/output unit 525 outputting game contents as an image signal or a sound signal. The game machine main body 520 may be an exclusive game device or an all-purpose computer. When the game controller 510 includes the reaction force generating unit 160 so that the user experiences the touch sensation as described above, the game machine main body 520 may transmit an appropriate reaction force signal to the game controller 510 according to the contents of the games.

The display device 530 may include an input/output unit 531 receiving an image signal and a sound signal transmitted by the game machine main body 520, a display unit 533 displaying an image according to the image signal, and a speaker 535 outputting a sound according to the sound signal. Alternatively, the speaker 535 may be included separately.

The game controller 510 and the game machine main body 520 may be connected in a wireless manner. Since the game controller 510 includes the charger 517 which harvests motion of the user as energy and stores the energy, even when the game controller 510 and the game machine main body 520 connect in a wireless manner, power used for operating the game controller 510 may be supplied from the charger 517. A battery (not shown) for supplying power may be further included in the game controller 510. Either the charger 517 or the battery may be used as an auxiliary element. As described above, in the case that the reaction force generating unit 160 (see FIG. 3) may require generating a large reaction force according to the contents of games, additional energy may be supplied from the charger 517 where sufficient energy cannot be supplied just from the battery.

Wireless transmission/reception between the game controller 510 and the game machine main body 520 may be connected as illustrated in FIGS. 10 and 11. According to an aspect of an example embodiment, the game controller 510 and the game machine main body 520 may also be connected to each other via a wire. With the game controller 510 and the game machine being connected via a wire, for example, electric energy may be supplied via the wire, and the charger 517 may be used as an auxiliary element.

Also, the game machine main body 520 and the display device 530 may be connected in a wired or wireless manner. The game machine main body 520 and the display device 530 may be separately formed as shown in FIGS. 10 and 11 but may also be formed as a single unit.

The game controller 510 and the game machine main body 520 according to an example embodiment may be separately formed but may not be limited thereto. A computer for executing a game program may be mounted in the game controller 510. As such, the game controller 510 may function as a game machine. Moreover, a display device may also be mounted in the game controller 510, and thus, the game controller 510 may be function as a portable game machine.

The linear generator, the rotational generator or the piezoelectric generator described in the above example embodiments may be examples of an energy harvesting element. However, example embodiments may not be limited thereto. For example, various other types of energy harvesting elements may be used in a game controller according to the example embodiments.

According to example embodiments, game controllers may be capable of securing energy needed for realizing a tactile reaction to improve a physical sensation when playing a game, game machines, and game systems using the game controllers.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be under stood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A game controller to manipulate a game program, comprising:
   an energy harvesting unit configured to harvest motion of a user as energy when playing a game; and
   an energy storing unit configured to store the energy harvested by the energy harvesting unit;
   a body portion, at least a portion thereof being deformable to have a plurality of forms; and
   a moving portion movable relative to the body portion, wherein the energy harvesting unit comprises a fixed magnet and a coil movable relative to the fixed magnet, and one of the fixed magnet and the coil is formed in the body portion, and the other of the fixed magnet and the coil is formed in the moving portion.

2. The game controller of claim 1, wherein the energy harvesting unit comprises an elastic body and a piezoelectric layer attached to the elastic body.

3. The game controller of claim 1, wherein the energy storing unit comprises a rectifying circuit configured to rectify the voltage of electric energy generated in the energy harvesting unit, a storage component configured to store electrical energy, and a charger configured to apply the rectified voltage to the storage component so as to charge the storage component.

4. The game controller of claim 1, further comprising a reaction force generating unit to generate a reaction force according to contents of the game, and the reaction force generating unit uses electric energy stored in the energy storing unit.

5. The game controller of claim 1, further comprising a game manipulation unit via which manipulation of the game by the user is input, wherein the game manipulation unit comprises at least one of a manipulation button and an operation recognizing sensor.

6. The game controller of claim 5, further comprising a computer to execute the game program, according to a signal input to the game manipulation unit.

7. The game controller of claim 1, further comprising: a battery configured to store energy, wherein
   each of the battery and the energy storing unit are configured to provide stored energy to the game controller.

8. The game controller of claim 1, further comprising a transmission/reception unit to transmit/receive data to/from a computer for executing the game program.

9. A game controller to manipulate a game program, the game controller comprising:
   an energy harvesting unit configured to harvest motion of a user as energy when playing a game;
   an energy storing unit configured to store the energy harvested by the energy harvesting unit;
   a body portion, at least a portion thereof being deformable to have a plurality of forms; and
   a moving portion movable relative to the body portion, wherein the energy harvesting unit is one of a linear generator and a rotational generator comprising a fixed magnet and a coil movable relative to the fixed magnet, and one of the fixed magnet and the coil is formed in the body portion, and the other of the fixed magnet and the coil is formed in the moving portion.

10. The game controller of claim 9, wherein the body portion comprises a fixable multijoint structure.

11. The game controller of claim 9, wherein the plurality of forms comprise a straight line, a straight line having two portions bent in different directions, a circle, and a circle having a grip.

12. A game controller to manipulate a game program, the game controller comprising:
- an energy harvesting unit configured to harvest motion of a user as energy when playing a game; and
- an energy storing unit configured to store the energy harvested by the energy harvesting unit, wherein the energy harvesting unit is one of a linear generator and a rotational generator comprising a fixed magnet and a coil movable relative to the fixed magnet, the game controller is in the form of a pump action rifle having a hand grip movable in a lengthwise direction of a body of a gun barrel, and one of the fixed magnet and the coil is formed in the body of the gun barrel, and the other of the fixed magnet and the coil is formed in the hand grip.

13. A game machine comprising:
a game manipulation unit via which a manipulation of a game by a user is input; an energy harvesting unit configured to harvest motion of the user as energy when the game is played;
an energy storing unit configured to store the energy harvested by using the energy harvesting unit;
a computer unit configured to execute a game program according to a signal input by using the game manipulation unit;
a display unit to display characteristics of the game program executed in the computer unit;
a body portion, at least a portion thereof being deformable to have a plurality of forms; and
a moving portion movable relative to the body portion, wherein: the energy harvesting unit comprises a fixed magnet and a coil movable relative to the fixed magnet, and one of the fixed magnet and the coil is formed in the body portion, and the other of the fixed magnet and the coil is formed in the moving portion.

14. The game machine of claim 13, wherein the game machine is a portable mobile device in which the game manipulation unit, the energy harvesting unit, the energy storing unit, the computer unit, and the display unit are installed in one housing.

15. A game system comprising:
a game controller configured to manipulate a game program, the game controller comprising an energy harvesting unit, configured to harvest motion of a user to energy when a game is played, and an energy storing unit configured to store the energy harvested by using the energy harvesting unit;
a computer connected to the game controller in a wired or wireless manner, wherein the game program is executed in the computer according to a manipulation signal transmitted by using the game controller;
a display device to output an image from the computer;
a body portion, at least a portion thereof being deformable to have a plurality of forms; and
a moving portion movable relative to the body portion, wherein:
the energy harvesting unit comprises a fixed magnet and a coil movable relative to the fixed magnet, and one of the fixed magnet and the coil is formed in the body portion, and the other of the fixed magnet and the coil is formed in the moving portion.

16. A method of manipulating a game program with a game controller, the method comprising:
harvesting, via an energy harvesting unit, motion of a user as energy when playing a game by moving a coil relative to a fixed magnet; and
storing the energy harvested by the energy harvesting unit within a storage component, wherein:
the game controller comprises: a body portion, at least a portion thereof being deformable to have a plurality of forms; and
a moving portion movable relative to the body portion, and one of the fixed magnet and the coil is formed in the body portion, and the other of the fixed magnet and the coil is formed in the moving portion.

17. A non-transitory computer-readable recording medium having embodied thereon a program that, when executed by a computer, performs a method of manipulating a game program with a game controller, the method comprising:
harvesting, via an energy harvesting unit, motion of a user as energy when playing a game by moving a coil relative to a fixed magnet; and storing the energy harvested by the energy harvesting unit within a storage component, wherein:
the game controller comprises:
a body portion, at least a portion thereof being deformable to have a plurality of forms; and
a moving portion movable relative to the body portion, and one of the fixed magnet and the coil is formed in the body portion, and the other of the fixed magnet and the coil is formed in the moving portion.

18. A game controller to manipulate a game program, the game controller comprising:
a linear generator comprising a fixed magnet and a coil that is movable relative to the fixed magnet, the liner generator configured to convert energy of linear motion supplied by a user playing a game with the game controller into electrical energy; and
an energy storing unit configured to store the electrical energy, wherein:
the linear generator further comprises:
a body portion, at least a portion thereof being deformable to have a plurality of forms; and
a moving portion movable relative to the body portion, and one of the fixed magnet and the coil is formed in the body portion, and the other of the fixed magnet and the coil is formed in the moving portion.

* * * * *